United States Patent [19]

Gotoh

[11] 4,404,455
[45] Sep. 13, 1983

[54] AUTOMATIC WELDING APPARATUS WITH WELD LINE DETECTING MEANS

[75] Inventor: Tohru Gotoh, Kasugai, Japan

[73] Assignee: Mitsubishi Denki Kabushiki Kaisha, Tokyo, Japan

[21] Appl. No.: 283,742

[22] Filed: Jul. 15, 1981

[51] Int. Cl.³ ............................................. B23K 9/12
[52] U.S. Cl. .............................. 219/124.34; 219/161; 228/9
[58] Field of Search ...................... 219/124.22, 124.34, 219/161; 318/575, 576, 578, 672, 673; 228/8, 9

[56] References Cited

U.S. PATENT DOCUMENTS

| | | | |
|---|---|---|---|
| 2,696,547 | 12/1954 | Felton et al. | 219/161 |
| 2,786,127 | 3/1957 | Osweiler | 219/161 |
| 3,171,012 | 2/1965 | Morehead | 219/124.34 |
| 3,530,273 | 9/1970 | Bollinger et al. | 318/576 |
| 3,938,797 | 2/1976 | Frederick | 219/161 |
| 4,008,384 | 2/1977 | Cecil | 219/124.34 |
| 4,151,394 | 4/1979 | Cecil | 219/124.34 |

FOREIGN PATENT DOCUMENTS 53-36629 4/1978 Japan .

Primary Examiner—C. C. Shaw
Attorney, Agent, or Firm—Wenderoth, Lind & Ponack

[57] ABSTRACT

An automatic welding apparatus for welding plate-like welding workpieces is provided wherein a weld line of the plate-like welding workpieces is detected, while a compressive force is being applied on the workpieces, by a detecting means which is adapted to be moved along the weld line, and a welding torch is moved in accordance with the results of the detection to carry out automatic welding of the workpieces.

4 Claims, 5 Drawing Figures

AUTOMATIC WELDING APPARATUS WITH WELD LINE DETECTING MEANS

BACKGROUND OF THE INVENTION

1. Field of the Invention

The present invention relates to an automatic welding apparatus and more particularly to an automatic welding apparatus which can automatically move a welding torch along a welding line of plate-like welding workpieces.

In manufacturing machinery and tools it is often the case that plate-like members are welded together. For example, in a fluid tank provided with radiation fins, such as a casing for a transformer or the like, a corrugated radiation plate as shown in FIG. 1 of the attached drawings is used. In the example shown in FIG. 1 a metal sheet 1 having a thickness of about 1 mm is folded in a corrugated configuration at an interval A to form folded portions 2 at equal intervals, and each of the folded portions 2 has both its edge parts 2a and 2b pressed together, respectively, leaving a central portion 3 therebetween with the confronting portions of the metal sheet being extended outwards from each other, and the edge parts 2a and 2b are welded together, respectively, to form water tight seals. The metal sheet 1 thus shaped is used as e.g. the side walls of a liquid containing tank. However, when such a corrugated radiation plate is used in the contruction of a liquid containing tank, since the overall rigidity of the plate is insufficient for use as a tank wall, it is usual to weld to both edges of the plate 1 margin plates 4 and 5, each having a thickness of about 3 mm, respectively, to increase the overall rigidity, as shown in FIG. 2.

In practice, since one of the margin plates, the margin plate 4, is usually positioned at the top, its outer edge is bent with a curvature so as to form a rounded portion 4a over substantially the whole length, and on the rounded portion 4a is mounted a cover plate (not shown). The other of the margin plates, i.e. plate 5, has its outer edge bent at right angles so as to form a bent part 5a which is adapted to mount a bottom plate (not shown).

When the corrugated radiation plate 1 is to be stifferend by adopting such a construction as shown in FIG. 2, margin plates 4 and 5 and the corrugated radiation plate 1 are welded together with a lap joint having a predetermined lapping width of B, but since the end portions 2a and 2b of the folded portion 2 are formed by the bending of the metal sheet, it is often the case that a space 6 having a triangular shape is formed or an offset C is generated between the adjoining ends of the base portions 7 of folding portion 2 in the course of the shaping process. Further, since owing to internal residual stresses caused at the time of the shaping process the corrugated radiation plate 1 as a whole develops twists and warps, it has been impossible to weld the related joint portions between the corrugated radiation plate 1 and the margin plates 4 and 5 automatically by the use of an automatic welding machine. Therefore, it has been unavoidable that the actual welding has had to be carried out manually by a welding operator skilled in welding technique, yet without being able easily to ensure consistent welding quantity, and so poor productivity has resulted.

SUMMARY OF THE INVENTION

It is an object of the present invention to provide an automatic welding apparatus which allows the automatic welding of plate-like welding workpieces.

It is another object of the present invention to provide an automatic welding apparatus which allows the automatic welding of plate-like welding workpieces both easily and reliably.

In accordance with one aspect of the present invention an automatic welding apparatus adapted to weld by means of a welding torch plate-like welding workpieces held together by a compressive force is provided, which comprises a drive means to move the welding torch, a detecting means to detect a welding line, and control means to control the movement of the welding torch by the drive means in accordance with a detecting signal from the detecting means.

In accordance with another aspect of the present invention in the automatic welding apparatus there is provided a detecting means to detect a welding line including a profiling sensor to abut against the plate-like welding workpieces to receive a reactive force therefrom, and a detector to detect the welding line by detecting the reactive force received by the profiling sensor.

DESCRIPTION OF THE PREFERRED EMBODIMENT

Figure 3:
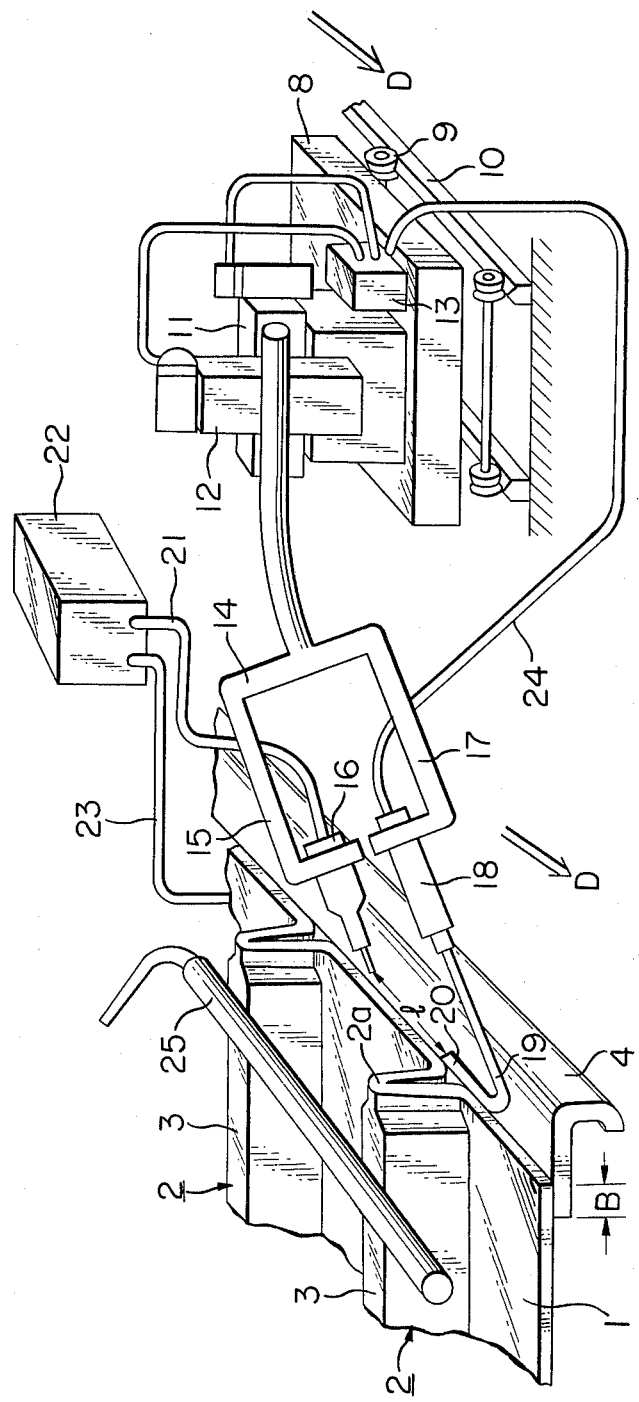
FIG. 3 is a schematic perspective representation of one embodiment of the automatic welding apparatus according to the present invention.

Referring now to FIG. 3 which shows one embodiment of the present invention, the reference numeral 8 shows a carriage adapted to move along rails 10 on wheels 9, the rails 10 being laid along the principal direction D of a welding line shown by the arrow.

Mounted on the carriage 8 is a horizontal slider 11, and a vertical slider 12 mounted on the horizontal slider 11, both sliders 11 and 12 being adapted to have the amount of shift controlled by a control means 13, respectively.

Fixedly secured to the vertical slider 12 is one end of a holder 14, the other end thereof being bifurcated, and at the free end of one of the bifurcated arms, 15, is fixedly secured a welding torch 16, and at the free end of the other arm 17 a detecting means 18 is fixedly secured. At this point it is to be noted that carriage 8 or the holder 14 constitutes a moving means to move the welding torch 16. Fixedly secured to the free end of the detector 18 is a profiling sensor 19 having a generally L-shaped form. The profiling sensor 19 is bent into an L-shaped form so as to provide a straight portion 20 at its forward end. The length of the straight portion 20 is selected so that it is longer than the distance between the adjoining base portions of the folded portion 2 of the corrugation.

Welding torch 16 is connected to a welding machine 22 through a cable 21, welding machine 22 and corrugated radiation plate 1, which constitutes a welding workpiece, being connected through a cable 23 so that a welding current circuit is completed between the welding torch 16 and the corrugated radiation plate 1.

The detector 18 and the control means 13 are connected by a cord 24, the detector 18 supplying an output signal to the control means 13 on the basis of a signal from the profiling sensor 19.

In FIG. 3 the reference numeral 25 designates a hose constituting a pressure means to apply a predetermined compressive force to the welding workpieces, an internal pressure of some several kg/cm² prevailing in the hose 25 which presses the upper end surfaces of the folded portions 2 of the corrugated radiation plate 1, the hose 25 being adapted to uniformly press the upper end surfaces of the folded portions 2 regardless of any difference in height of the folded portions 2, to constrain them. Although not shown, the hose 25 is urged downwards from above by pressing members and is supported by supporting members from below near the lapping portion B between the corrugated radiation plate 1 and the margin plate 4.

Figure 4:
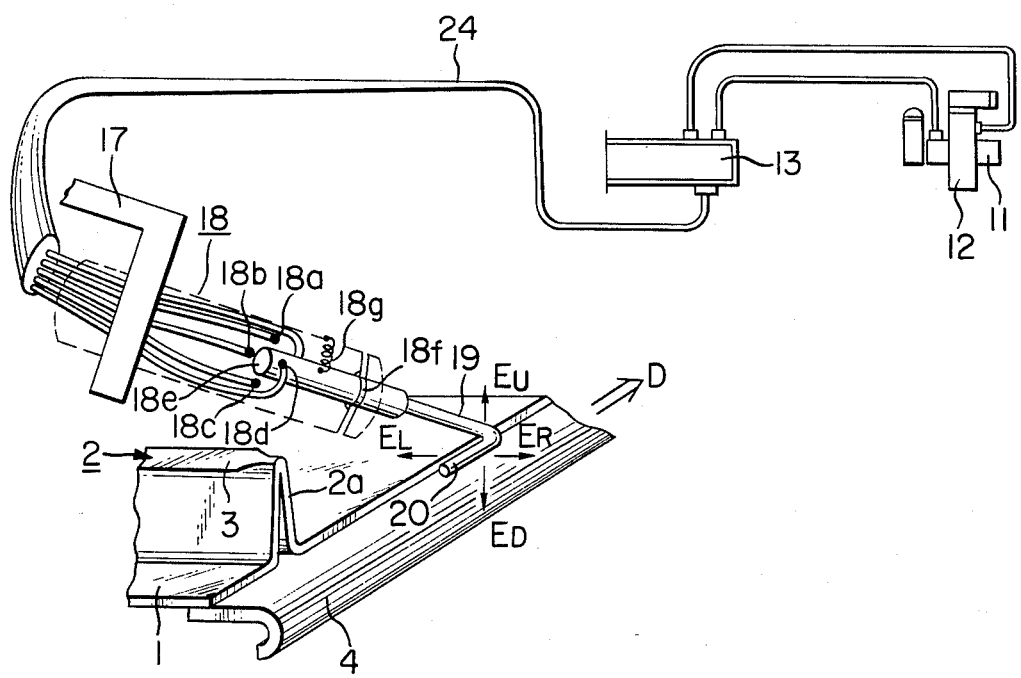
FIG. 4 is a schematic perspective view showing the details of the detecting means and the profiling sensor shown in FIG. 3.

The construction of the detecting means comprising the profiling sensor 19 and a detector 18 will be fully explained in reference to FIG. 4 wherein reference numerals represent similar or corresponding elements to those shown in FIG. 3 by the same reference numerals, and accordingly the explanations of those elements are omitted herein.

Within the detector 18 shown by the dotted lines in FIG. 4 a pole rod 18e integral with the profiling sensor 19 is adapted to pivot about a pivot ring 18f so that the upper end portion of the pole rod 18e and the profiling sensor 19 can move up and down as well as right and left in opposite directions from each other, the pole rod 18e being supported by a spring 18g such that when the profiling sensor 19 does not come into contact with the welding workpieces the upper end portion of the pole rod 18e is in contact with the contacts 18a and 18d disposed therearound. When the contacts 18a, 18b, 18c and 18d disposed around the upper end portion of the pole rod 18e are contacted thereby respectively, a contact signal is transmitted to the control means 13 through cables connected to the contacts, respectively, whereby the sliders 11 and 12 are operated in accordance with the respective contact signals as shown in the following table, whereas when no contacts are contacted by the upper end portion of the pole rod 18e the sliders 11 and 12 all remain at a standstill. In FIG. 4 the arrows $E_U$, $E_D$, $E_R$ and $E_L$ represent the direction of motion or two orthogonal directions among the profiling directions of the profiling sensor 19.

TABLE

| Contact to be contacted with Pole Rod 18e | Movement of Sliders |
| --- | --- |
| Contact 18a | Vertical slider 12 moves downwards |
| Contact 18b | Horizontal slider 11 moves to the right |
| Contact 18c | Vertical slider 12 moves upwards |
| Contact 18d | Horizontal slider 11 moves to the left |

From the table it will be understood that when the contact 18a is contacted by the pole rod 18e the slider 12 moves downwards; when the contact 18b is contacted by the pole rod 18e the slider 11 moves to the right; when the contact 18c is contacted by the pole rod 18e the slider 12 moves upwards; and when the contact 18d is contacted by the pole rod 18e the slider 11 moves to the left.

The upper end portion of the pole rod 18e is so constructed that it can make contact with the respective contacts either independently or with an adjoining pair of contacts, simultaneously, but it cannot make contact with three or more of the contacts at the same time. Further, the upper end portion of the pole rod 18e is also constructed such that at the start of the welding operation, i.e. when the profiling sensor 19 is positioned at the upper right hand portion of the corrugated radiation plate 1 or the margin plate 4 as viewed in FIG. 4 the upper end portion of the pole rod 18e is in contact with the contacts 18a and 18d.

Figure 5:
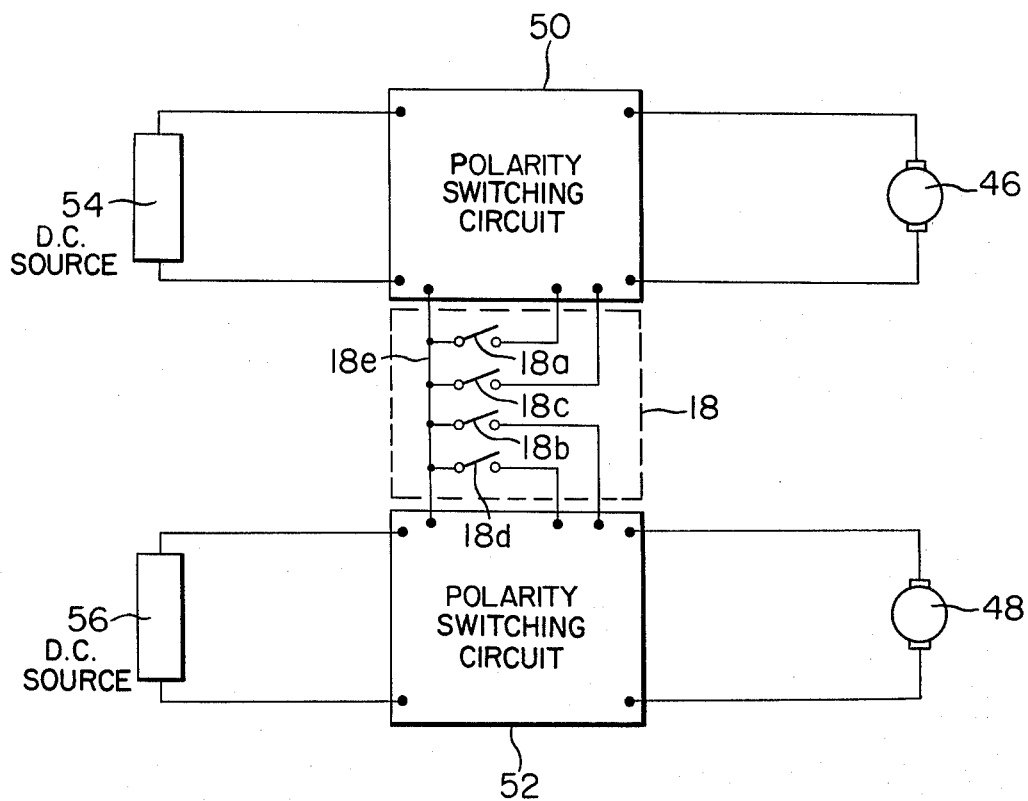
FIG. 5 is a circuit diagram showing a circuit to shift the sliders shown in FIG. 3.

Next the construction of the drive circuit for the sliders 11 and 12 will be briefly explained in reference to FIG. 5.

As shown in FIG. 5 a drive motor 46 to drive the vertical slider 12 has its direction of rotation determined by a polarity switching circuit 50 depending upon the closing of either contact 18a or 18c of the detector 18 and is driven by a direct current source 54. A drive motor 48 to drive the horizontal slider 11 has its direction of rotation determined by a polarity switching circuit 52 and is driven by a direct current source 56. Drive motors 46 and 48 are each driven at a constant velocity and by a constant current.

The operation of the automatic welding apparatus according to the present invention will now be explained.

In brief, first the welding line is determined by setting the straight portion 20 of the profiling sensor 19 alongside the side edge of the corrugated radiation plate 1 and the welding torch 16 is set so as to correspond to the welding line. With the parts in this state the welding machine 22 is actuated to supply an electric current to the welding torch 16, and the carriage 8 is moved, commencing the welding operation. During the welding operation, if the welding line changes upwards or downwards the amount of change is transmitted to the control means 13 through the cord 24 so that the vertical slider 12 is moved so as to follow the change by moving an appropriate amount in the upwards or downwards direction. Similarly, if the welding line changes in the horizontal direction, the horizontal slider 11 is moved so as to follow the change by moving an appropriate amount in the horizontal direction.

Now the detecting or profiling operation of the welding line by the profiling sensor 19 and the detector 18 will be fully explained.

For example, if the apparatus is operated in the state where the straight portion 20 of the profiling sensor 19 is located at a position above and to the right of corrugated radiation plate 1 and margin plate 4 as viewed in FIG. 4, i.e. the state with the straight portion 20 out of contact therewith, since in this state the upper end portion of the pole rod 18e of the detector 18 is in contact with the contacts 18a and 18d through the action of the support spring 18g, the holder 17 moves downwards to the left due to the contact signal from the contacts. Thereafter, when the straight portion 20 of the profiling sensor 19 comes into contact with the margin plate 4, the profiling sensor 19 pivots about the support ring 18f to be swung upwards or in the direction of EU, the upper end portion of the pole rod 18e moves downwards so as to separate from contact with the contact 18a and so as to can in contact with the contact 18d and, holder 17 moves to the left or in the direction of $E_L$ only. If the straight portion 20 of the profiling sensor 19 comes into contact with the side edge e f g h of the corrugated radiation plate 1, the profiling sensor 19 is directed to the right through the support ring 18f, resulting in the movement of the upper end portion of the pole rod 18e to the left opposite to the direction of motion of the profiling sensor 19 so as to separate the contact from the contact 18d. In this case, the resultant of the force urging the upper end portion of the pole rod 18e towards a point midway between the contacts 18a and 18d by the action of the support spring 18g and the reactive force of the profiling sensor 19 received from the side edge of the corrugated radiation plate 1 and the surface of the margin plate is placed in equilibrium so that the upper end portion of the pole rod 18e does not come into contact with any of the contacts 18a to 18d, the holder 17 being at a standstill, the standstill state being maintained. Therefore, is the carriage 8 is moved along the principal direction of the welding line D profiled welding automatically takes place.

As to the equilibrium of the force of the support spring 18g and the reactive force from the welding workpieces in the state where the holder 17 is at a standstill as above described, although the equilibrium force is determined by the strength of the support spring 18g, in the embodiment described and shown the external force applied to the forward end of the profiling sensor 19 is about 60 gr, i.e. the profiling operating pressure is substantially 60 gr. Thus, when the profiling sensor 19 or the holder 17 moves in the principal welding direction D as the carriage 8 moves, if a force greater than 60 gr is applied in any one of the four directions, i.e. upwards, downwards, to the right, or to the left, the holder 17 will be moved so that profiling in the two axes is realized. It has been confirmed that in this profiling operation a profiling accuracy in the region of ±0.3 mm is guaranteed, and on-off control can be carried out with this accuracy.

Figure 1:
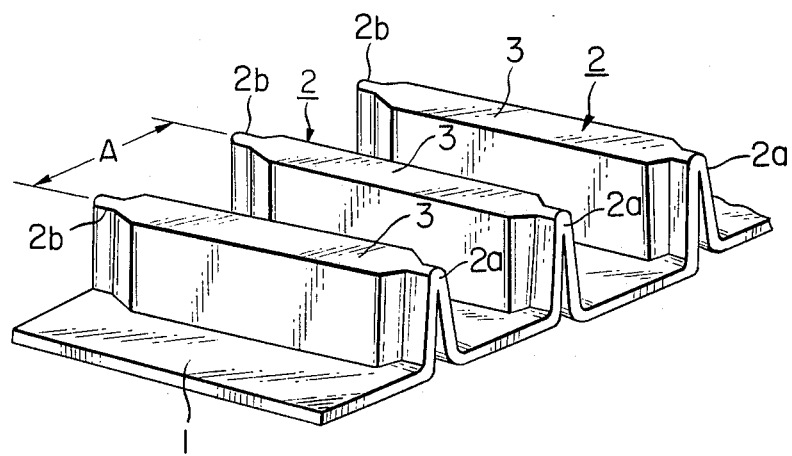
FIG. 1 is a perspective view of a corrugated radiation plate to which a margin plate or plates are welded by the apparatus of the present invention.
Figure 2:
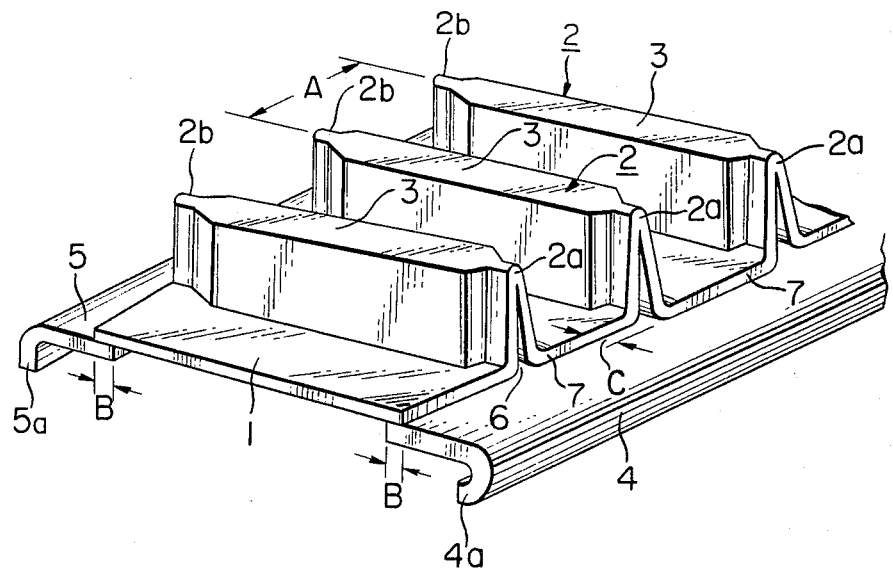
FIG. 2 is a perspective view showing the corrugated radiation plate and margin plates to be welded together.

Since the length of the straight portion 20 of the profiling sensor 19 is greater than the width of the substantially triangular space 6 formed between the base portions of the folded portion 2 of the corrugated radiation plate 1 (see FIG. 2), during the welding operation the straight portion 20 of the profiling sensor 19 does not enter into the triangular space 6 so it does not deviate from the welding line. Further, since the corrugated radiation plate 1 is under a compressive force by means of hose 25, twisting or warping of the corrugated radiation plate 1 as a whole is corrected so that it is welded to the margin plate 4 while they are in close contact with each other.

Even though there may exist a certain offset c in the side edge of the corrugated radiation plate 1 between the base portion of the triangular portion 6, if the distance l between the forward end of the straight portion 20 of the profiling sensor 19 and the welding torch is substantially less than the distance between the base portions of the triangular 6, no welding error due to the deviation of the welding line will occur. That is, when the distance l between the forward end of the straight portion 20 of the profiling sensor 19 and the welding torch is less than the distance A between adjoining folded portions 2 of the corrugated radiation plate 1, there can be present between the profiling sensor 19 and the welding torch 16 only one space 6. Otherwise it may occur that two or more spaces 6 can be present therebetween so that the offset c would cause a profiling error. Therefore, the distance l between the forward end of the profiling sensor 19 and the welding torch 16 is preferably as small as possible. Thus, although it is generally preferably that the distance l between the forward end of the straight portion 20 of the profiling sensor 19 and the welding torch 16 be small, if the distance l is too short there is the danger of the straight portion 20 of the profiling sensor 19 being burned out by the arc of the welding torch 16, and so the distance l is determined with these points taken into consideration. In practice a minimum length of 30 mm is selected for the distance l in consideration of the dimension of the welding torch 16 and the profiling sensor 19, the relative positions therebetween, etc.

Although the present invention has been explained above with reference to the corrugated radiation plate 1 being welded to only one of the margin plates, 4, in practice it is advantageous to weld the corrugated radiation plate 1 to both the margin plates 4 and 5 simultaneously by the use of two sets of automatic welding apparatus according to the present invention. Further, although the present invention has been explained above with one welding workpiece a corrugateed radiation plate for a transformer, needless to say the present invention is by no means limited to such application.

Thus, the automatic apparatus according to the present invention may also be contemplated for use e.g. in a case where a number of square or rectangular plate-like metal members are laid on a metal plate at intervals so that their edges are aligned in a line and the former are to be welded at their edges to the metal plate. Also it will be appreciated that the present invention can be practiced otherwise than in the embodiment described and shown herein within the scope of the present invention.

What is claimed is:

1. An automatic welding apparatus for welding two workpieces into overlapping relationship with the first workpiece having a substantially flat surface extending laterally away from the position of the overlapping a substantial distance relative to the size of the workpieces and the second workpiece lying on the first workpiece with the thickness thereof perpendicular to the flat surface of the first workpiece and having portions extending perpendicularly away from the flat surface of the first workpiece at intervals therealong and an edge lying along the flat surface of the first workpiece with the surface of the edge substantially perpendicular to the flat surface and having apertures in the edge at the portions extending perpendicularly away from the first workpiece, the apertures facing laterally of the edge along the flat surface of the first workpiece extending away from the position of the overlapping, said apparatus comprising:

a weld torch;

moving means on which said welding torch is mounted for moving said welding torch along a path parallel to the edge of the second workpiece and for moving the welding torch toward and away from the surface of the edge and toward and away from the flat surface;

a weld line detector means for engaging the flat surface of the first workpiece and the edge of the second workpiece and movable therealong for sensing a weld line along the position of overlapping and for producing an output representative of the position of the weld line, said detector means having probe consisting of a sensor extending toward the weld line and a straight portion integral with the end of said sensor and extending parallel with the weld line, said straight portion having a diameter substantially the same as the thickness of the second workpiece and being longer than the dimension of the apertures parallel to the weld line, the distance between the end of said straight portion and said welding torch being less than the distance between adjacent perpendicularly extending portions;

control means to which said weld line detector means is connected and in turn connected to said moving means for moving said moving means toward and away from the flat surface and the edge in response to said output for causing said welding torch to follow the weld line; and a pressure means for exerting a pressure on the perpendicularly extending portions on the second workpiece, said pressure means comprising a flexible element deformable by a reactive force from the perpendicularly extending portions and positioned above the outer ends of the perpendicularly extending portions and directly engageable with the individual perpendicularly extending portions for exerting the reactive force individually thereon when the welding torch is along the weld line.

2. An apparatus as claimed in claim 1 in which said pressure means is a hose having a pressure medium therein at a predetermined pressure and engaging with each of the individual perpendicularly extending portions independently of the other perpendicularly extending portions.

3. An apparatus as claimed in claim 1 wherein said moving means comprises a carriage movable parallel to the weld line, sliders mounted on said carriage and movable horizontally and vertically, and a holder on which said welding torch is mounted and movable by the movement of said sliders.

4. An apparatus as claimed in claim 1 in which said weld line detector is mounted on said holder.

* * * * *